United States Patent Office 3,177,973
Patented Apr. 13, 1965

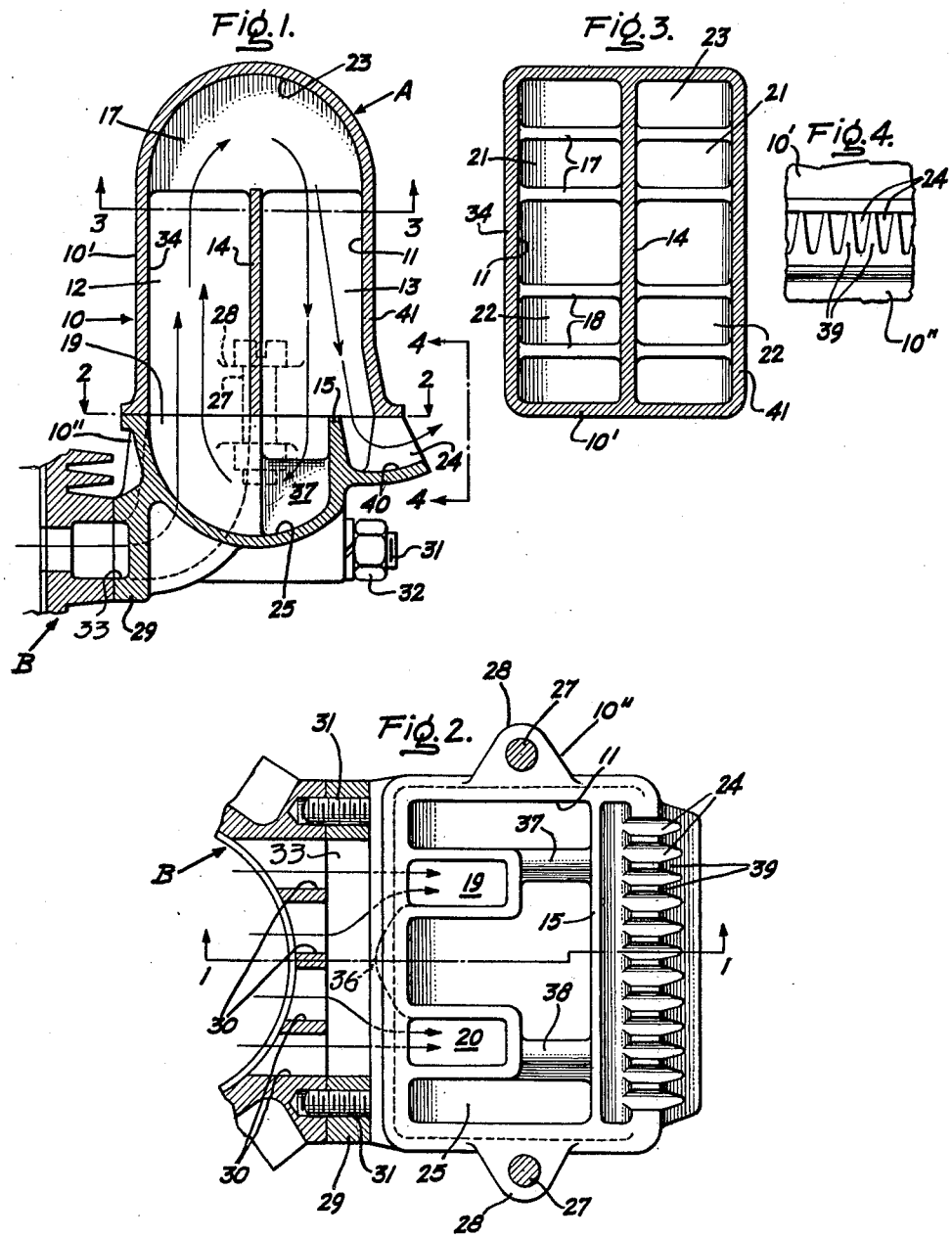

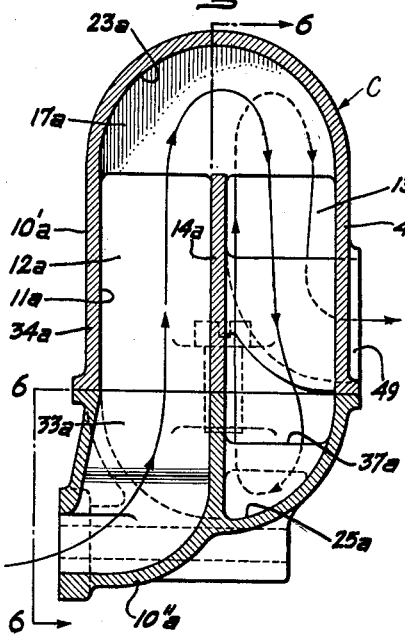
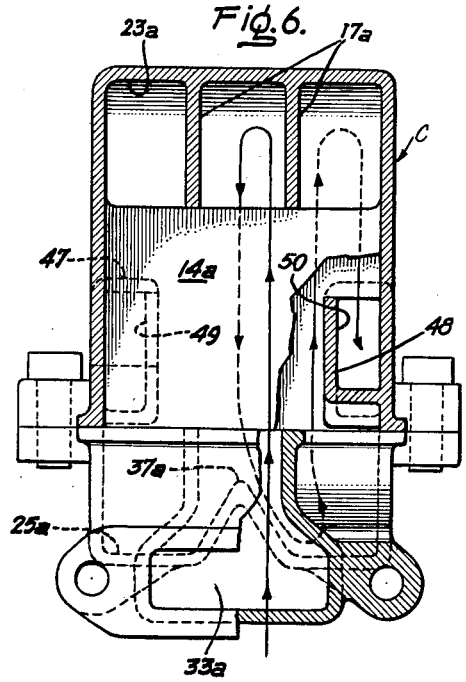
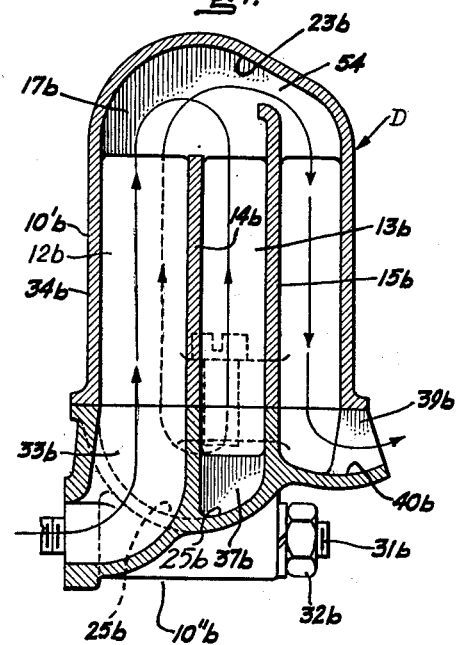

3,177,973
GAS RECIRCULATING MUFFLER
Wensel Benes, 12440 Hilltop Drive, Los Altos Hills, Calif.
Filed Mar. 4, 1963, Ser. No. 262,448
9 Claims. (Cl. 181—58)

The present invention relates to mufflers, and pertains more particularly to improvements in a gas recirculating muffler for a two stroke cycle internal combustion engine.

In a two stroke cycle engine, each incoming charge of air-gas mixture is introduced to the cylinder under pressure, ordinarily from the crankcase, at or near the end of each power stroke of each cylinder. This occurs simultaneously with the latter portion of the exhaust cycle, so that the better the scavenging of burning and burned gases from the prior power stroke when the fresh charge of air-gas mixture enters the cylinder, the better will be the performance and efficiency of the engine, other things being equal.

Upon the opening of the exhaust valve at or near the end of each power stroke, the exhaust gases, being under high pressure, initially rush out of the cylinder at high velocity, but as the pressure within the cylinder drops, so does the velocity of the exhaust gases, and the result is an incomplete scavenging of the burned gases from the cylinder. This is particularly true in cases where a muffler is employed of the type which tends to build up back pressure at the exhaust port during each exhaust cycle.

This feature of two stroke cycle engines is well known, and in the past attempts have been made to improve mufflers for such engine so as to reduce the amount of back pressure so caused. However, such prior attempts, although in some cases providing some of the sought-for improvement, have still not fully solved the problem.

The present invention provides an improved, exhaust gas circulating muffler.

Another object of the invention is to provide an exhaust gas circulating muffler which creates a side-by-side flow of fresh and recirculated exhaust gases in zones where the tendency for creating turbulence and loss of velocity is least, and which shields such fresh and recirculated exhaust gases from each other in zones where such turbulence creating tendency is greatest.

Another object is to provide a muffler for a two-stroke-cycle engine wherein a generally annular chamber is provided and is arranged to receive the exhaust gases substantially tangentially thereof, for whirling around within the chamber, partitions being provided in the chamber to create an annular swirl path for the gases and to limit the flow of the fresh gases with that of the recirculated gases in a manner to stimulate a thorough scavenging of the exhaust gases, a shear-off type exhaust opening being provided to direct the gases to the atmosphere in a more sustained flow, and therefore with reduced noise making capacity, than that at which they enter the chamber.

These, and other objects and advantages of the invention, will be apparent from the following description and the accompanying drawings, wherein:

FIG. 1 is a sectional view through one form of gas-recirculating muffler embodying the invention.

FIG. 2 is a sectional view taken along line 2—2 of FIG. 1.

FIG. 3 is a sectional view taken along line 3—3 of FIG. 1.

FIG. 4 is a fragmentary elevational view looking in the direction of the arrows 4—4 of FIG. 1.

FIG. 5 is a sectional view, similar to FIG. 1, but showing a modified form of the invention.

FIG. 6 is a sectional view taken along line 6—6 of FIG. 5.

FIG. 7 is a sectional view similar to FIG. 1, but showing another modified form of the invention.

Briefly, the form A of the invention shown in FIGS. 1–4 comprises a two part housing 10 having a chamber 11 therein. The chamber 11 is divided into two generally similar passages 12 and 13 by a central partition 14, which terminates short of the cylindrically curved top and bottom of the chamber 11.

Two pairs of identical, gas directing baffles 17 and 18 are provided in the curved upper portion of the housing 10, and are located directly above the sides of a pair of twin exhaust ducts 19 and 20, respectively (FIGS. 2 and 3). A shear-off wall 15 is provided at the lower end of the second passage 13.

Exhaust gases from an engine cylinder B (FIGS. 1 and 2) enter the first passage 12 in two, high velocity streams, through the twin ducts 19 and 20 (FIGS. 1 and 2), accelerating, in the direction of their flow, any residual gases in the passage 12. After traversing the first passage 12, major portions of these two gas streams enter spaces 21 and 22 (FIG. 3) between the two pairs of baffles 17 and 18, and are deflected by the curved top surface 23 of the chamber 11, around and over the top of the partition 14. Thence they flow in a reverse direction downwardly through the second passage 13, again accelerating any residual gases therein in the direction of their flow. As the gases reach the lower end of this second passage 13, a portion thereof is sheared off by the wall 15 and is deflected to the atmosphere through exhaust openings 24.

The remaining gases are deflected, by the curved bottom surface 25 of the chamber 11, around the lower end of the partition 14 and up again into the first passage 12 alongside the exhaust ducts 19 and 20. In the event that exhaust gas is at such time issuing at high velocity from these ducts 19 and 20, gas friction therewith tends to accelerate the recirculating gases. At the end of each exhaust cycle, however, when the velocity of the exhaust gases issuing from these ducts is greatly reduced, the kinetic energy of the recirculating gases, passing the open ends of these twin ducts 19 and 20, tends to induce a suction-like flow of the exhaust gases therethrough, thereby greatly improving the scavenging action of the engine.

Referring to the drawings in greater detail, the form A of the invention shown in FIGS. 1–4 comprises the two-part housing 10, consisting of an upper portion 10′ and a lower portion 10″, secured together in sealed relation by bolts 27, passing through ears 28 provided one on each end of each of the housing portions 10′ and 10″.

The lower housing portion 10″ is formed with a pad 29 for fitting around the exhaust port 30 of the conventional, two-cycle, gasoline engine cylinder B, to which cylinder it is connected by studs 31 and nuts 32. A smoothly curving exhaust gas duct 33 is formed in the lower housing portion 10″ and through the pad 29 to be co-extensive, at its lower end, with the engine exhaust portion 30. This duct is divided at 36 (FIG. 2) to form the twin ducts 19 and 20 (FIG. 2). These twin ducts 19 and 20 discharge the exhaust gases from the engine cylinder B, in the form of two upwardly directed, parallel streams, lengthwise of the first passage 12 between the wall 34 of the upper housing portion 10′ and the central partition 14. A pair of peaked baffles 37 and 38 extends transversely of the lower housing portion 10″, one from the outer side of each of the twin discharge ducts 19 and 20 to the opposite side of the lower housing portion 10″. These baffles 37 and 38 divide the downcoming gas stream from the second passage 13, and divert it around the lower ends of their respective gas ducts 19 and 20.

The inner surface of the lower housing portion 10″, except for the portion occupied by the ducts 19 and 20, is curved substantially cylindrically except for the substantially vertical shear-off wall 15. The upper edge of this shear-off wall 15 is spaced inwardly from the upper ends of a plurality of comb-like teeth 39, which are formed on a curved shelf portion 40 and extend to the plane of the joint between the upper and lower housing portions to thereby provide the plurality of exhaust openings 24.

The shear-off wall 15 preferably is spaced approximately one-third of the distance from the lower end of the upper housing portion wall 41 to the partition 14.

The central partition 14 terminates at its upper and lower ends, respectively, substantially on the axes of curvature of the cylindrically curved top and bottom chamber surfaces 23 and 25. The two pairs of semi-circular baffles 17 and 18 in the upper end of the upper housing portion 10' are perpendicular to the upper edge of the partition 14, and one of these baffles is located directly above each side of each of the ducts 19 and 20 when the housing is assembled as shown in FIG. 1. These two pairs of baffles 17 and 18 guide the two parallel streams of exhaust gases from the ducts 19 and 20 around the semi-cylindrical upper chamber surface 23 of the chamber 11, and thus avoid excessive turbulence and mixing of these gases with the slower speed recirculating gases on both sides thereof during their reversal of flow over the upper edge of the partition 14, as indicated by the arrows in FIG. 1.

In considering the operation of the present invention, it will be borne in mind that the exhaust portion of each cycle of each cylinder is of extremely short duration. For example, in order to reduce the figures to round numbers, it is assumed that the engine of which the cylinder B is a part is operating at six thousand revolutions per minute, a not unusual speed for a small, two-cycle engine. At one power cycle per revolution, this results in one hundred exhaust cycles per second. Even if the exhaust valve remained open for a full half of a cycle or revolution, this would mean that each exhaust cycle has a duration of but five milliseconds.

During this extremely short time interval the velocity of the gases discharged from the engine exhaust port 30 are accelerated rapidly to high velocity by an initial high pressure in the cylinder, decrease in velocity as the pressure in the cylinder drops during the terminal portion of such cycle, and then cease during the remainder of the engine cycle. The high velocity gases which are discharged during the early part of each such exhaust cycle are directed upwardly, in parallel streams, from the ducts 19 and 20.

The displacement effect and gas friction of these two high velocity gas streams on any residual gases in the chamber 11 at such time, as may be best visualized from the showing in FIGS. 1 and 2, tends to accelerate the residual gases in the chamber in the same direction as the exhaust gases discharged from the ducts 19 and 20. These two, high velocity gas streams continue upwardly through the passage 12 and, with some slight diffusion and loss of velocity, enter the spaces 21 and 22 (FIG. 3) between the two pairs of the semi-circular baffles 17 and 18, directly above the respective ducts 19 and 20 (FIG. 2) from which they are discharged.

The cylindrically curved top chamber surface 23 diverts these high velocity gases around, over the top of the partition 14, and then reversely downwardly into the second passage 13 on the other side of the partition 14, while the slower flowing residual gases on both sides thereof are similarly diverted around and over the top of the partition and downwardly into the second passage 13. In this second passage 13, as in the first one 12, the two high velocity gas streams emerging from their respective spaces 21 and 22 (FIG. 3) further accelerate and mix with the streams of residual gases on both sides thereof. As these combined gases reach the lower end of the second passage 13, the entire gas mass will be traveling at high velocity, and a portion thereof will be sheared off by the upright shear-off wall 15 and will be diverted, by the curved shelf 40, laterally outwardly, through the openings 24 between the comb-like teeth 39, to the atmosphere, as indicated by the arrows in FIG. 1.

The remainder of this rapidly moving gas mass will be diverted around and beneath the lower end of the partition 14 by the curved lower chamber surface 25, and at the same time will be divided by the peaked baffles 37 and 38 and diverted around both sides of the ducts 19 and 20. Here these recirculating gases again enter the first passage 12 alongside the open ends of the ducts 19 and 20.

This cycle, recurring, in the present example, one hundred times per second, produces a constantly whirling gas mass in the nature of a gas fly wheel, which is re-accelerated by the kinetic energy of each discharge of exhaust gases from the engine cylinder B.

This circuitous, high-velocity gas flow is, therefore, continuous, so that at the terminal portion of each exhaust cycle, when the pressure drops within the cylinder B, and the velocity of the exhaust gas passing through the ducts 19 and 20 is thereby reduced, this high velocity, re-circulating gas mass, passing the discharge ends of the exhaust ducts 19 and 20, exerts a sucking action on these ducts, thereby tending to more fully evacuate the burned gases from the cylinder B during the terminal portion of each exhaust cycle.

Since a portion of the kinetic energy of the exhaust gases is used, as explained previously herein, in accelerating the re-circulating residual gases within the chamber 11, and since a portion of the circulating gases is constantly being sheared off by the shear-off wall 15 during the operation of an engine upon which the muffler A is mounted, the pressure peaks of the exhaust are greatly reduced. This reduction of pressure peaks reduces the exhaust noise substantially, and provides an efficient and effective muffler, which not only has a substantial muffling effect on the exhaust, but also tends to create a sucking action during the terminal portion of each exhaust cycle for improved scavenging. This sucking action during the terminal portion of each exhaust cycle prevents re-entry of exhaust gases into the cylinder.

A modified form C of the invention is shown in FIGS. 5 and 6. Since the general structure of this form C of the invention is generally quite similar to the form A shown in FIGS. 1–4, corresponding parts of the form C shown in FIGS. 5 and 6 are identified by the same reference numerals as those employed in FIGS. 1–4, with the suffix "a" added.

In the form C, the exhaust gases from an engine cylinder, not shown, are discharged through a single, central duct 33a which curves upwardly as shown in FIGS. 5 and 6 and discharges a single upward stream of exhaust gases centrally of a passage 12a, between the housing wall 34a and the central partition 14a. These upwardly moving exhaust gases transfer a portion of their kinetic energy, by displacement effect and gas friction, to any residual gases in the passage 12a. However, a major portion of this high velocity gas stream from the duct 33a is received centrally of the chamber between a pair of semi-circular baffles 17a located one directly above each side of the duct 33a therebeneath.

Such high velocity central gas stream, slightly diffused and reduced in velocity, is then deflected over the top of the partition 14a and reversed in direction by the semi-cylindrically curved top surface 23a of the chamber 11a. Thence this gas stream, together with the other gases, is directed downwardly into the second passage 13a. A pair of box-like shear-off walls 47 and 48 are provided, one spaced inwardly from each end wall of the upper housing portion 10'a. The portions of the whirling gas mass sheared off by these walls 47 and 48 are discharged to the atmosphere through discharge openings 49 and 50 provided in the side wall 41a of the housing. These shear-off walls 47 and 48 are spaced inwardly from their respective housing end walls a distance sufficient to enclose a gas discharge area of approximately one-third of the total cross sectional area of the second passage 13a.

In the second passage 13a the high velocity central gas stream, emerging from between the semi-circular baffles 37a, accelerates the residual gases in the passage 13a in the same manner as that explained previously herein for the form A of the invention, (FIGS. 1–4). As these intermixed gases reach the lower end of the second passage 13a, they encounter a peaked central divider baffle 37a in the lower housing portion 10″a. The divider 37a diverts these gases toward opposite sides of the upwardly directed exhaust duct 33a, while the curved chamber bottom surface 25a again deflects the gases around the lower end of the partition 14a and thence upwardly again into the passage 12a along both sides of the duct 33a.

The gases in this form C of the invention, like those in the form A shown in FIGS. 1–4, tend to provide a constantly recirculating, high velocity, whirling flow of gases in the chamber 11a, with a portion of the whirling gas mass being constantly sheared off and discharged to the atmosphere through the exhaust openings 49 and 50 during operation of an engine upon which the muffler C is mounted. At the same time, a high velocity gas flow is constantly maintained past the discharge end of the exhaust duct 33a, which flow, during the terminal portion of each exhaust cycle, exerts an injector-like sucking action on the duct 33a, thereby tending toward a more complete evacuating of the exhaust gases from the engine.

In the further modified form D of the invention shown in FIG. 7, the parts thereof corresponding to parts of the form A of the invention shown in FIGS. 1–4 will be identified by the same reference numerals, with the suffix "b" added. In this form D (FIG. 7) of the invention, a single central exhaust duct 33b is provided in a lower housing portion 10″b, with a pair of baffles 17b provided, one above each side of the exhaust duct 33b, similar to those 17a shown in FIG. 6. In this form D of the invention, a first passage 12b is formed between a partition 14b and the housing side wall 34b, while a second passage 13b is provided between the partition 14b and an elongated shear-off wall 15b. The upper end of the shear-off wall 15b extends above the upper end of the partition 14b to a sufficient height to provide an exhaust opening 54 at its upper end of approximately one-third the cross sectional area of the space between the upper end of the partition 14b and the curved upper chamber surface 23b. A curved shelf 40b at the lower end of the shear-off wall 15b deflects the exhaust gases to the atmosphere between comb-like teeth 39b.

The portion of the whirling gas mass which is not sheared off by the shear-off wall 15b is reversed in direction by the curved upper chamber surface 23b, and passes downwardly through the second passage 13b. As these gases reach the lower end of the second passage 13b, they are divided by a peaked divider baffle 37b, similar to the divider 37a shown in FIGS. 5 and 6, and are again reversed in direction by the curved lower chamber surface 25b. Thence they are again directed upwardly into the first passage 12b along both sides of the duct 33b.

In each of the illustrated forms of the invention, a high velocity, re-circulating gas mass is provided which is continually accelerated and re-circulated at high velocity by the recurring exhaust cycles of the engine upon which it is mounted. This recirculating gas mass is directed past the discharge end of an exhaust duct therein in the same direction in which the exhaust gases are emitted therefrom, so as to provide, during the terminal portion of each exhaust cycle, a sucking effect on the exhaust duct which tends toward a more complete evacuation of the exhaust gases from the engine cylinder.

While I have illustrated and described a preferred embodiment of the present invention, and two modified forms thereof, it will be understood, however, that various changes and modifications may be made in the details thereof without departing from the scope of the invention as set forth in the appended claims.

Having thus described the invention, what I claim as new and desire to protect by Letters Patent is defined in the following claims.

1. A muffler for an internal combustion engine comprising:
   means forming a chamber and comprising a straight central portion and rounded end portions,
   a partition extending transversely across within the straight central portion and dividing the latter into two straight passages, the partition terminating short of the rounded end portions,
   an exhaust duct openly communicating with the exhaust port of an internal combustion engine and opening lengthwise into, and extending transversely of, one of the chamber passages to discharge exhaust gases from such engine along the one straight passage toward and around one rounded end portion into the other straight passage,
   baffle means mounted in the one rounded end portion and positioned to retain gases discharged from the duct against spreading while traversing the one rounded end portion,
   the chamber forming means having a gap in the straight central portion thereof communicating the other chamber passage with the atmosphere to provide an exhaust opening in the other chamber passage through which gases are exhausted from the chamber, and
   baffle means in the other rounded end portion and positioned to deflect gases passing the exhaust opening around the sides of the duct and thence alongside the duct and into said one chamber passage in the direction toward which the duct is directed to discharge gases.

2. An arrangement according to claim 1 wherein the baffle means in the one rounded end portion toward which the exhaust gases are discharged from the duct comprise a pair of semi-circular baffles fitted into the one rounded end portion, one thereof being in line with each side of the duct.

3. An arrangement according to claim 1 wherein the exhaust duct is one of two exhaust ducts in parallel, laterally spaced relation openly communicating with the exhaust port of an internal combustion engine and directed to discharge exhaust gases in the same direction into the chamber along one of the passages of the straight, central chamber portion, and the baffle means in the other rounded end portion are positioned to deflect and guide gases passing the exhaust opening around the sides of, and thence alongside, both of the ducts and into said one chamber passage in the direction toward which the ducts are directed to discharge gases.

4. An arrangement according to claim 1 wherein a portion of the chamber forming means defines a pair of box like enclosures openly communicating with the other chamber passage from that with which the exhaust duct communicates and with the atmosphere to provide the exhaust opening in the other chamber passage.

5. A muffler for an internal combustion engine comprising:
   a two part housing,
   means securing the two housing parts together to form a chamber,
   a partition dividing one of the housing parts into two passages, and spaced at both ends from the portions of the housing enclosing such chamber to form a continuous path for whirling gases in recurring cycles within the chamber and endwise around the partition,
   an exhaust duct openly communicating with the exhaust port of an internal combustion engine and opening into the chamber along one side of, and directed endwise of, the partition, and means in the housing on the opposite side of the partition from the exhaust duct providing a shear-off exhaust opening in the chamber to exhaust a portion of the whirling gases upon each cycle thereof around their continuous path.

6. A muffler for an internal combustion engine comprising:

a housing having a chamber therein, means in the housing dividing the chamber into two passages, and spaced at both ends thereof from the housing to form a continuous path for whirling gases in recurring cycles along such path within the chamber, an exhaust duct openly communicating with the exhaust port of an internal combustion engine and opening lengthwise into the extending transversely of one of the passages, baffle means mounted in a chamber end portion and positioned parallel to the path of whirling gas flow in the chamber to thereby retain whirling exhaust gases against spreading while passing around an end of the partition, and means in an outer chamber wall of the housing forming a shear-off exhaust opening communicating with the atmopshere from the other of the passages from that into which the exhaust duct opens to exhaust a portion of the gases upon each cycle thereof around their continuous path.

7. An arrangement according to claim 4 where the box-like enclosures are offset laterally from direct alignment with the duct, whereby a major portion of the gases sheared off by the box-like enclosures are recirculating gases.

8. A muffler for an internal combustion engine comprising:

means forming a chamber, means dividing the chamber into two passages communicating at their ends to form a continuous path, an exhaust duct openly communicating with the exhaust port of an internal combustion engine and opening into the chamber substantially tangentially of such path, the duct extending into the chamber transversely of the path, baffle means mounted in the means forming the chamber and positioned to retain exhaust gases discharged by the duct against spreading, the means forming the chamber having an opening therein spaced downstream from the duct relative to the direction of the flow of gases along such path to provide an exhaust opening from the chamber, and baffle means in the chamber positioned to guide the exhaust gases around the sides of the duct and thence alongside the duct outlet in the direction of gas discharge therefrom.

9. An arrangement according to claim 8 wherein a downstream edge portion of the means defining the exhaust opening extends inwardly of the chamber further than the upstream edge portion thereof to provide a shear-off type exhaust opening.

References Cited by the Examiner
UNITED STATES PATENTS

| | | |
|---|---|---|
| 330,242 | 11/85 | Kidder. |
| 1,344,367 | 6/20 | Wickersham. |
| 2,139,736 | 12/38 | Durham _____ 181—58 |
| 2,170,704 | 8/39 | Bourne. |
| 2,809,716 | 10/57 | Gill. |
| 3,074,506 | 1/63 | Benes _____ 181—58 |

LEO SMILOW, *Primary Examiner.*